United States Patent
Mohamed Yousuf Sait et al.

(10) Patent No.: US 11,928,756 B2
(45) Date of Patent: Mar. 12, 2024

(54) GEOGRAPHIC AUGMENTED REALITY DESIGN FOR LOW ACCURACY SCENARIOS

(71) Applicant: GOOGLE LLC, Mountain View, CA (US)

(72) Inventors: Mohamed Suhail Mohamed Yousuf Sait, Mountain View, CA (US); Andre Le, Mountain View, CA (US); Juan David Hincapie, Mountain View, CA (US); Mirko Ranieri, Mountain View, CA (US); Marek Gorecki, Mountain View, CA (US); Wenli Zhao, Mountain View, CA (US); Tony Shih, Mountain View, CA (US); Bo Zhang, Mountain View, CA (US); Alan Sheridan, Mountain View, CA (US); Matt Seegmiller, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 1 day.

(21) Appl. No.: 17/482,303

(22) Filed: Sep. 22, 2021

(65) Prior Publication Data

US 2023/0088884 A1    Mar. 23, 2023

(51) Int. Cl.
| | | |
|---|---|---|
| *G06T 11/00* | (2006.01) | |
| *G01C 21/20* | (2006.01) | |
| *G06T 7/70* | (2017.01) | |
| *G06T 7/73* | (2017.01) | |

(52) U.S. Cl.
CPC .............. *G06T 11/00* (2013.01); *G01C 21/20* (2013.01); *G06T 7/74* (2017.01); *G06T 2207/30196* (2013.01)

(58) Field of Classification Search
CPC .............. G06T 11/00; G06T 7/74; G06T 7/70
See application file for complete search history.

(56) References Cited

U.S. PATENT DOCUMENTS

| | | | |
|---|---|---|---|
| 8,803,916 B1 | 8/2014 | Paczkowski et al. | |
| 9,659,410 B2 | 5/2017 | Hancock et al. | |
| 9,749,583 B1* | 8/2017 | Fineberg | H04L 67/52 |
| 9,870,429 B2 | 1/2018 | Stirbu et al. | |
| 10,739,599 B2 | 8/2020 | Shpunt | |
| 10,930,076 B2 | 2/2021 | Bastov et al. | |
| 2015/0138329 A1* | 5/2015 | Braun | A61B 5/6861 |
| | | | 348/71 |

(Continued)

FOREIGN PATENT DOCUMENTS

WO    WO-2018/059934 A1    4/2018

*Primary Examiner* — Yi Yang
(74) *Attorney, Agent, or Firm* — MARSHALL, GERSTEIN & BORUN LLP

(57) ABSTRACT

To present augmented reality features without localizing a user, a client device receives a request for presenting augmented reality features in a camera view of a computing device of the user. Prior to localizing the user, the client device obtains sensor data indicative of a pose of the user, and determines the pose of the user based on the sensor data with a confidence level that exceeds a confidence threshold which indicates a low accuracy state. Then the client device presents one or more augmented reality features in the camera view in accordance with the determined pose of the user while in the low accuracy state.

17 Claims, 7 Drawing Sheets

(56) References Cited

U.S. PATENT DOCUMENTS

| | | | |
|---|---|---|---|
| 2015/0194128 A1* | 7/2015 | Hicok | H04N 23/61 |
| | | | 345/592 |
| 2017/0357858 A1* | 12/2017 | Mendonca | G06T 7/73 |
| 2018/0087907 A1* | 3/2018 | DeBitetto | B60W 30/00 |
| 2018/0239144 A1 | 8/2018 | Woods et al. | |
| 2018/0253837 A1* | 9/2018 | Ghesu | G06T 7/75 |
| 2018/0322654 A1* | 11/2018 | Chen | G06T 7/74 |
| 2020/0012106 A1* | 1/2020 | Shpunt | G02B 27/0172 |
| 2020/0033127 A1* | 1/2020 | Tsujii | G06F 1/3212 |
| 2020/0082522 A1* | 3/2020 | Bonneau | G06T 7/0004 |
| 2020/0348423 A1* | 11/2020 | Bae | G06V 10/811 |
| 2021/0150419 A1* | 5/2021 | Drayna | H04W 4/40 |

* cited by examiner

GEOGRAPHIC AUGMENTED REALITY DESIGN FOR LOW ACCURACY SCENARIOS

FIELD OF THE DISCLOSURE

The present disclosure relates to augmented reality systems and, more particularly, to providing augmented reality features when a user cannot be located with pinpoint accuracy.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Today, augmented reality applications require a user to be located with pinpoint accuracy. To locate the user with such high precision, these applications may require the user to perform certain steps, such as pointing their client device at neighboring buildings or geographic features, which the user may have difficulty performing and thus may be unable to effectively use the augmented reality applications. Additionally, these applications may take a long time to precisely locate the user and often timeout without being able to present any augmented reality features.

SUMMARY

To reduce the amount of time it takes to present augmented reality (AR) content and increase the number instances in which augmented reality content may be presented to users, a geographic augmented reality system presents augmented reality content in two states: a low accuracy state (also referred to herein as an "instant mode") and a high accuracy state (also referred to herein as a "high accuracy mode"). The geographic augmented reality system determines the pose of the user based on sensor data from the user's client device. The sensor data may include sensor data from a positioning sensor such as a global positioning system (GPS) sensor, an accelerometer, a gyroscope, a compass, a magnetometer, a transceiver that receives wireless signals from nearby devices, a camera that captures an image of the current camera view, or any other suitable sensors within the client device.

The geographic augmented reality system determines the pose of the user with a confidence level indicative of the accuracy of the pose determination. Then the geographic augmented reality system determines the accuracy state based on the confidence level. More specifically, when the confidence level for the pose is within a confidence threshold (e.g., 25 degrees), the geographic augmented reality system may determine that the client device is in the high accuracy state. On the other hand, when the confidence level exceeds the confidence threshold (e.g., 25 degrees), the geographic augmented reality system may determine that the client device is in the low accuracy state. In some implementations, the geographic augmented reality system determines that the client device is in the low accuracy state when the confidence level exceeds a first confidence threshold (e.g., 25 degrees) but is within a second confidence threshold (e.g., 55 degrees). When the confidence level exceeds the second confidence threshold, the geographic augmented reality system may not present any augmented reality content.

In any event, the geographic augmented reality system presents different augmented reality content depending on the accuracy state. For example, when the client device is in the low accuracy state, and the user requests navigation directions to a destination location, the geographic augmented reality system may present an augmented reality feature overlaying the user's camera view that indicates the direction of the destination location relative to the user. The geographic augmented reality system may also present an indicator of the low accuracy state, and the indicator may include a user control, which when selected, may provide instructions for entering the high accuracy state. In another example, when the client device is in the low accuracy state, the geographic augmented reality system may present an augmented reality feature overlaying the user's camera view that indicates the direction of a landmark which may not be visible in the camera view. The landmark may be a landmark which is familiar to the user, such as the user's home or a well-known building such as the Empire State Building. In this manner, the geographic augmented reality system may help orient the user while in the low accuracy state.

When the client device is in the high accuracy state and the user requests navigation directions to a destination location, the geographic augmented reality system may present a different augmented reality feature than the augmented reality feature when the client device was in the low accuracy state. For example, the geographic augmented reality system may present a pin at the destination location within the camera view. The geographic augmented reality system may also present an indicator above the pin which may include the name of the destination location, a description of the destination location, a distance or duration to the destination location, or any other suitable information regarding the destination location. The geographic augmented reality system may also present an indicator of the high accuracy state. In another example, the geographic augmented reality system may present indicators overlaying buildings within the camera view. The indicators may indicate the type of building (e.g., a restaurant, a bar, a department store, etc.), the name of the building, or may include any other suitable information about the building. In some implementations, each indicator may include a user control, which when selected, may provide additional information regarding the building.

In this manner, the geographic augmented reality system presents augmented reality content near instantaneously when the user enters the augmented reality environment. This reduces lag time and provides opportunities for more users to view augmented reality content, thereby improving the user experience. Moreover, this provides additional time for the geographic augmented reality system to present augmented reality content in the high accuracy state before a timeout and before the user exits the application.

One example embodiment of the techniques of this disclosure is a method for presenting augmented reality features without localizing a user. The method includes receiving a request for presenting augmented reality features in a camera view of a computing device of the user. Prior to localizing the user, the method includes obtaining sensor data indicative of a pose of the user, determining the pose of the user based on the sensor data with a confidence level that exceeds a confidence threshold which indicates a low accuracy state, and presenting one or more augmented reality features in the camera view in accordance with the determined pose of the user while in the low accuracy state.

Another example embodiment is a computing device for presenting augmented reality features without localizing a user. The computing device includes a camera, one or more processors, and a computer-readable memory coupled to the camera and the one or more processors and storing instructions thereon. When executed by the one or more processors, the instructions cause the computing device to receive a request for presenting augmented reality features in a camera view of the camera. Prior to localizing the user, the instructions cause the computing device to obtain sensor data indicative of a pose of the user, determine the pose of the user based on the sensor data with a confidence level that exceeds a confidence threshold which indicates a low accuracy state, and present one or more augmented reality features in the camera view in accordance with the determined pose of the user while in the low accuracy state.

Yet another example embodiment is a non-transitory computer-readable medium storing instructions thereon. When executed by one or more processors, the instructions cause the one or more processors to receive a request for presenting augmented reality features in a camera view of a computing device of a user. Prior to localizing the user, the instructions cause the one or more processors to obtain sensor data indicative of a pose of the user, determine the pose of the user based on the sensor data with a confidence level that exceeds a confidence threshold which indicates a low accuracy state, and present one or more augmented reality features in the camera view in accordance with the determined pose of the user while in the low accuracy state.

DETAILED DESCRIPTION

Overview

The present disclosure provides techniques for presenting AR features to a user before the user can be localized with a confidence level that is within a confidence threshold (e.g., before the user's orientation can be determined with a margin of error of less than ±20 degrees). In this manner, AR features may be presented to the user almost immediately (e.g., within 5 seconds), thereby reducing the amount of time it takes to present AR features to the user. More specifically, in prior implementations, applications took over ten seconds on average to localize the user before presenting AR features. This also improves the likelihood that the user is able to be localized at all. In prior implementations, about 90 percent of users failed to localize and roughly half of them (45 percent) gave up and closed the application within the first 5 seconds well before the average user was presented with AR features. Furthermore, users of the multi-accuracy state AR system are less likely to lose localization after being localized than users of prior systems.

The term "pose" as used herein, may refer to the location and/or orientation of an object. For example, the pose of the user may be a combination of the user's current location and the direction the user is facing, the pose of the user may be the user's current location, or the pose of the user may be the direction the user is facing.

The term "localized" or "localizing" as used herein, may refer to determining a pose with a confidence level that is within a confidence threshold, such that the margin of error of the pose determination is less than a threshold amount. For example, the margin of error for determining that a user has been localized may be ±20 degrees or ±30 degrees. In another example, the margin of error for determining that a user has been localized may be ±20 meters or ±30 meters. In yet another example, the margin of error for determining that a user has been localized may be ±20 degrees and ±20 meters. The confidence threshold for localizing a user may be a first confidence threshold having a smaller margin of error than a second confidence threshold for determining that AR content can be presented in the low accuracy state when the confidence level for the pose exceeds the first confidence threshold but is within the second confidence threshold.

Example Hardware and Software Components

Figure 1:
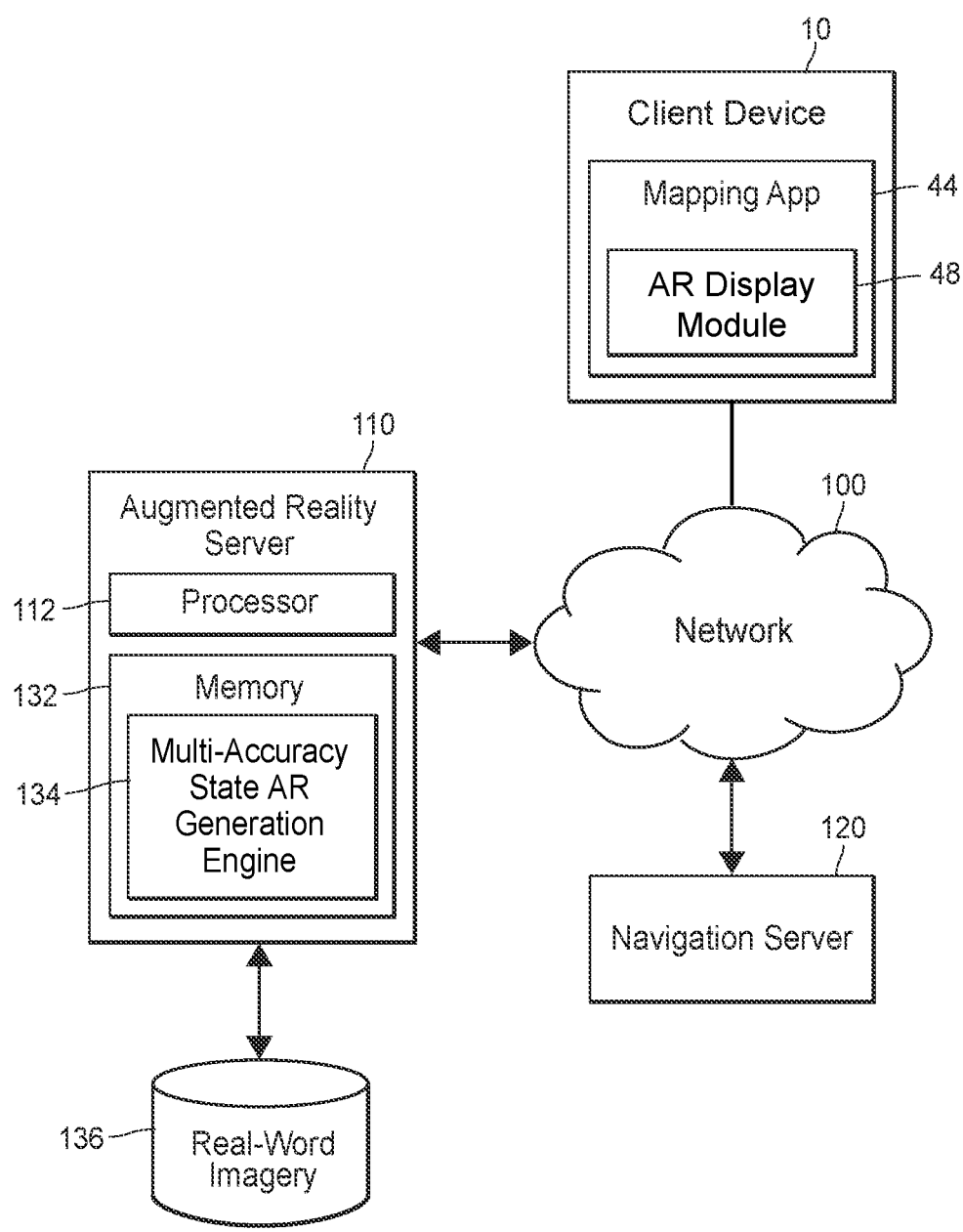
FIG. 1 is a block diagram of an example communication system in which a client device and server devices can operate to implement the multi-accuracy state AR system.

Referring to FIG. 1, an example communication system in which the techniques outlined above can be implemented includes a client device 10 which may be a portable device configured to execute a mapping application 44. In addition to the client device 10, the communication system includes a server device 110, such as an augmented reality server configured to provide augmented reality features in multiple accuracy states overlaying real-world imagery to the client device 10. The communication system also includes a navigation server device 120 configured to provide a map display and navigation data to the client device 10.

The client device 10, the augmented reality server 110, and the navigation server 120 may be communicatively connected to each other through a network 100. The network 100 may be a public network, such as the Internet, or a private network such as an intranet.

The augmented reality server 110 can be communicatively coupled to a database 136 that stores, in an example implementation, real-world imagery for various geographic areas. In this manner, the augmented reality server 110 may compare real-world imagery from a camera view of the client device 10 to the real-world imagery in the database 136 to identify the pose of the user. The augmented reality server 110 may also be communicatively coupled to a database that stores augmented reality features, such as shapes and graphics to overlay on real-world imagery. More generally, the server device 110 can communicate with one or several databases that store any type of information that can be used in the augmented reality environment. In some implementations, the server device 110 may include several communicatively connected server devices. For example, the client device 10 may communicate with the navigation server 120 to receive navigation directions from a user's current location to a destination location. The navigation server 120 may then provide map data displaying the destination location, the current location, and navigation data presenting directions to the destination location. Furthermore, the client device 10 may communicate with the augmented reality server 110 to receive AR features and their corresponding positions within a camera view displaying real-world imagery in which to present the AR features in an AR mode of the mapping application 44 on the client device 10.

Figure 2:
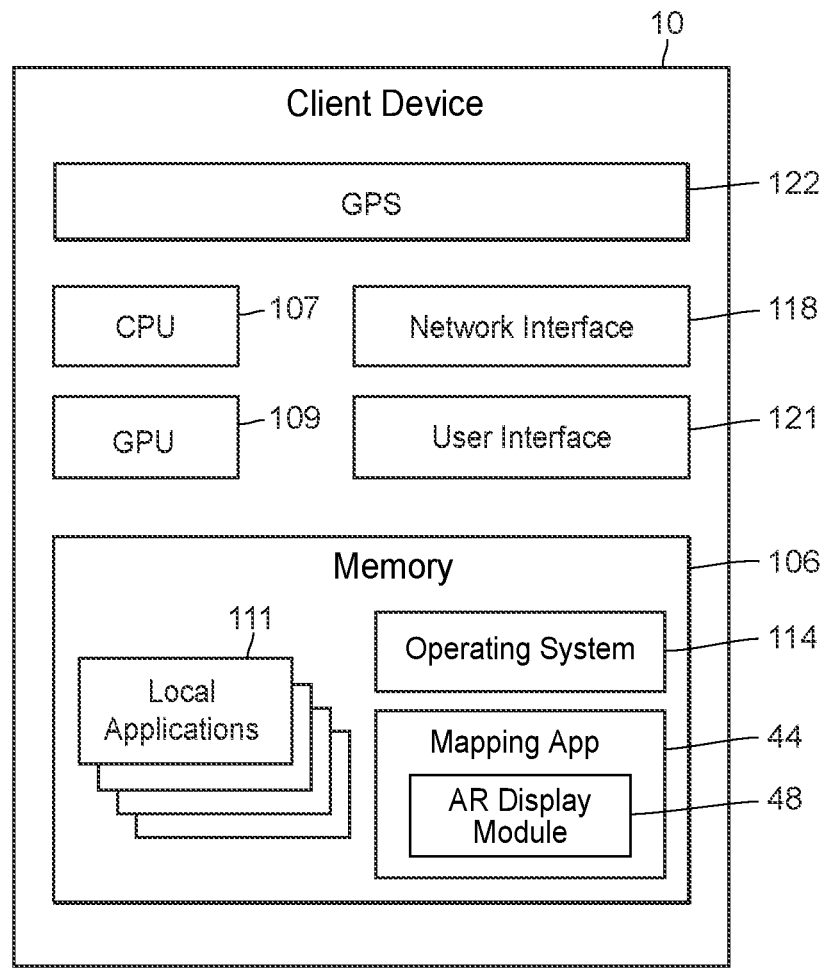
FIG. 2 is a block diagram of an example client device that can operate in the system of FIG. 1.

In an example implementation, as shown in FIG. 2, the client device 10 may be a smart phone or a tablet computer, for example, and includes a memory 106, one or more processors 107, a graphics processing unit (GPU) 109, a network interface 118, a user interface (UI) 121, and one or several sensors 122. The memory 106 can be a non-transitory memory and can include one or several suitable memory modules, such as random access memory (RAM), read-only memory (ROM), flash memory, other types of persistent memory, etc. The UI 121 may be a touch screen, for example. More generally, the techniques of this disclosure can be implemented in other types of devices, such as laptop or desktop computers, a device embedded in a vehicle such as a vehicle head unit, wearable devices, such as smart watches or smart glasses, etc.

Depending on the implementation, the one or more sensors 122 can include a camera, a global positioning system (GPS) module to detect the location of the client device 10, a compass to determine the direction of the client device 10, a gyroscope to determine the rotation and tilt, an accelerometer, a magnetometer, an inertial measurement unit (IMU), etc.

The memory 106 stores an operating system (OS) 114, which can be any type of suitable mobile or general-purpose operating system. The OS 114 can include API functions that allow applications (such as the mapping application 44 and other applications 111) to interface with each other, or to retrieve, for example, sensor readings. For example, a software application configured to execute on the client device 10 can include instructions that invoke an OS 114 API for retrieving a current location and orientation of the client device 10 at that instant. The API can also return a quantitative indication of how certain the API is of the estimate (e.g., as a percentage).

The memory 106 also stores the mapping application 44 which is configured to receive requests for navigation directions from a user's current location to a destination location. The mapping application 44 can then display navigation directions from the user's current location to the destination location. Moreover, the mapping application 44 can receive map data in a raster (e.g., bitmap) or non-raster (e.g., vector graphics) format from a map data database and/or the navigation server 120. Additionally, the mapping application 44 can receive requests for points of interest (POIs) and present indications of the POIs on the map display. The navigation directions may include directions for several modes of transport, such as driving directions, walking directions, bicycling directions, public transportation directions, ridesharing directions, or any suitable combination of these (e.g., multi-modal directions).

The mapping application 44 includes an AR display module 48 which is configured to switch the display of the mapping application 44 from a map display mode presenting two-dimensional (2D) map data of a geographic area indicating the user's current location and/or the destination location to an AR mode presenting a camera view of the area in front of the client device 10. The AR display module 48 obtains sensor data from the client device 10 to determine the pose of the user with a particular confidence level. Then the AR display module 48 determines the accuracy state for presenting AR features. For example, if the AR display module 48 determines the pose of the user with a confidence level that exceeds a confidence threshold (e.g., the confidence level for the orientation is greater than 20 degrees, the confidence level for the location is greater than 20 meters, etc.), the AR display module 48 determines that the client device 10 is in the low accuracy state. On the other hand, if the AR display module 48 determines the pose of the user with a confidence level that is within the confidence threshold (e.g., the confidence level for the orientation is less than 20 degrees, the confidence level for the location is less than 20 meters, etc.), the AR display module 48 determines that the client device is in the high accuracy state. In other implementations, the AR display module 48 determines that the client device 10 is in the low accuracy state when the confidence level for the pose of the user is within a first confidence threshold (e.g., the confidence level for the orientation is less than 50 degrees, the confidence level for the orientation is less than 50 meters, etc.) but exceeds a second threshold (e.g., 20 degrees, 20 meters, etc.).

In any event, the AR display module 48 then presents different AR features depending on the accuracy state of the client device 10. More specifically, the AR display module 48 may present more precise AR features for the high accuracy state than the low accuracy state. For example, in the low accuracy state, the AR display module 48 may present an indication in the camera view of an approximate direction of the destination location. The AR display module 48 may also include an indicator that the location accuracy is low with a user control, which when selected, provides instructions for improving the location accuracy. In the high accuracy state, the AR display module 48 may present an indication in the camera view of the destination location, such as a pin at the destination location. Moreover, the AR display module 48 may present an indication in the camera view of an estimated distance or duration to the destination location. As a result, the AR features in the high accuracy state indicate location information more precisely than in the low accuracy state.

The camera view includes real-world imagery, such as the buildings, streets, vehicles, and people within the field of view of the client device's 10 camera. Furthermore, the AR mode may present AR features overlaying the real-world imagery, such as shapes, colors, and graphics which may be placed on or above a particular vehicle, person, or location indicating a destination location, a POI requested by the user, POIs within the camera view, POIs familiar to the user, etc. In some implementations, the AR display module 48 may also present an AR feature that indicates a direction in which the user needs to turn to see the destination location.

It is noted that although FIG. 2 illustrates the mapping application 44 as a standalone application, the functionality of the mapping application 44 also can be provided in the form of an online service accessible via a web browser executing on the client device as a plug-in or extension for another software application executing on the client device etc. The mapping application 44 generally can be provided in different versions for different respective operating systems. For example, the maker of the client device 10 can provide a Software Development Kit (SDK) including the mapping application 44 for the Android™ platform, another SDK for the iOS™ platform, etc.

Turning back to FIG. 1, the augmented reality server 110 includes one or more processors 112, a network interface (not shown), and a memory 132. The memory 132 may be tangible, non-transitory memory and may include any types of suitable memory modules, including random access memory (RAM), read-only memory (ROM), flash memory, other types of persistent memory, etc. The memory 132 stores instructions executable on the processors 112 which can generate, via a multi-accuracy state AR generation engine 134, AR features to be displayed by the mapping application 44 overlaying real-world imagery. The memory 132, or the memory in another server similarly can store instructions that generate map displays and navigation directions to a destination location to be displayed by the mapping application 44. In some implementations, the navigation server 120 may initiate calls to the augmented reality server 110 for AR features to present overlaying real-world imagery in an AR mode of the mapping application 44 on the client device 10.

The multi-accuracy state AR generation engine 134 may receive a camera view or image from the camera of the client device 10, where the camera view depicts real-world imagery, such as buildings, streets, vehicles, and people within the field of view of the camera. The multi-accuracy state AR generation engine 134 may also receive additional sensor data from the GPS, accelerometer, gyroscope, compass, magnetometer, transceiver, or any other suitable sensors within the client device 10. Then the multi-accuracy state AR generation engine 134 may determine the pose of the user with a particular confidence level based on the sensor data.

In some implementations, the multi-accuracy state AR generation engine 134 determines the pose of the user by using a particle filter. For example, the multi-accuracy state AR generation engine 134 may determine a first pose with a first confidence level from the GPS sensor, a second pose with a second confidence level from the accelerometer, a third pose with a third confidence level from the gyroscope, a fourth pose with a fourth confidence level from the compass, a fifth pose with a fifth confidence level from the transceiver (e.g., where the location is determined based on the signal strength of signals emitted by nearby wireless beacons), etc. The particle filter may combine the poses and confidence levels from each of the sensors to generate a pose with a lower margin of error than the confidence levels for the individual sensors. The particle filter may combine the poses and confidence levels in any suitable manner, such as assigning weights to each of the poses. The particle filter may also generate probability distributions for the poses in accordance with their respective confidence levels (e.g., using a Gaussian distribution where the confidence level corresponds to two standard deviations). The particle filter may then combine the probability distributions for the poses using Bayesian estimation to calculate a minimum mean square (MMS) estimate.

More specifically, the particle filter may obtain N random samples of the probability distributions called particles to represent the probability distributions and assigns a weight to each of the N random samples. The particle filter then combines weighted particles to determine the pose having a confidence level with a lower margin of error than the confidence levels for the individual sensors.

Additionally, the multi-accuracy state AR generation engine 134 may determine the pose of the user by receiving a camera view or image from the camera of the client device 10, where the camera view depicts real-world imagery, such as buildings, streets, vehicles, and people within the field of view of the camera. This may occur after the client device 10 has entered the low accuracy state when the user selects a user control to improve the accuracy of the AR to transition to the high accuracy state. The multi-accuracy state AR generation engine 134 may then determine a pose corresponding to the camera view.

More specifically, the multi-accuracy state AR generation engine 134 may compare the camera view to several template camera views stored in the real-world imagery database 136, for example. Each of the template camera views or images may be stored with an indication of the camera viewpoint or location from which the image was taken (e.g., a GPS location specifying latitude and longitude coordinates, a street address, etc.), an indication of the orientation of the camera when the image was taken (e.g., the camera was facing north, thereby indicating that the camera view depicts an area to the north of the viewpoint), indications of the scale or zoom level for the camera view, and/or an indication of a geographic area corresponding to the camera view including indications of precise physical locations at various positions within the camera view based on the scale or zoom level. The orientation of the camera may include a tri-axis orientation indicating the direction the camera is facing (e.g., east, west, north, south, etc.), the tilt angle of the camera (e.g., parallel to the ground), and whether the camera is in the horizontal or vertical position.

For example, for a template camera view, the camera viewpoint may be from the corner of Main Street and State Street, where the camera faced east. The template camera view may depict a width of 5 m, a length of 7 m, and a height of 3 m. The multi-accuracy state AR generation engine 134 may then create a mapping of the precise location of each pixel or group of pixels in the template camera view based on the camera viewpoint, camera orientation, and size of the template camera view. For example, if the template camera view is 5 m wide, the width of the image is 500 pixels, and the orientation of the template camera view is facing east and perpendicular to the ground, each pixel may represent a physical width of approximately 1 cm. The camera viewpoint for a template camera view may be determined from the GPS location of the client device that captured the camera view, and the orientation may be determined from a gyroscope and/or a compass included in the client device that captured the camera view.

In any event, the multi-accuracy state AR generation engine 134 may compare a camera view from the camera of the client device 10 to the template camera views to determine the camera viewpoint, orientation, scale or zoom level for the camera view, and/or precise physical locations at various positions within the camera view based on the comparison. For example, the multi-accuracy state AR generation engine 134 may compare the camera view from the camera of the client device 10 to the template camera views using machine learning techniques, such as random forests, boosting, nearest neighbors, Bayesian networks, neural networks, support vector machines, etc.

More specifically, the multi-accuracy state AR generation engine 134 may identify visual features of each of the template camera views by detecting stable regions within the template camera view that are detectable regardless of blur, motion, distortion, orientation, illumination, scaling, and/or other changes in camera perspective. The stable regions may be extracted from the template camera view using a scale-invariant feature transform (SIFT), speeded up robust features (SURF), fast retina keypoint (FREAK), binary robust invariant scalable keypoints (BRISK), or any other suitable computer vision techniques. In some embodiments, keypoints may be located at high-contrast regions of the template camera view, such as edges within the template camera view. A bounding box may be formed around a keypoint and the portion of the template camera view created by the bounding box may be a feature.

The multi-accuracy state AR generation engine 134 may create numerical representations of the features to generate template feature vectors, such as the width and height of a feature, RGB pixel values for the feature, a pixel position of a center point of the feature within the image, etc. The multi-accuracy state AR generation engine 134 may then use the feature vectors as training data to create the machine learning model. If the machine learning technique is nearest neighbors, for example, the multi-accuracy state AR generation engine 134 may identify visual features of the camera view from the camera of the client device 10 to generate feature vectors. The multi-accuracy state AR generation engine 134 may then compare the feature vectors for the camera view from the camera of the client device 10 to the template feature vectors to identify a template camera view having the closest template feature vectors to the feature vectors for the camera view from the camera of the client device 10.

The AR generation engine 134 may then determine the camera viewpoint, orientation, scale or zoom level for the camera view, and/or precise physical locations at various positions within the camera view as the camera viewpoint, orientation, scale or zoom level for the identified template camera view, and/or precise physical locations at various positions within the identified template camera view.

In yet other implementations, the multi-accuracy state AR generation engine 134 may determine the pose of the user with a particular confidence level based on any suitable combination of the sensor data and a comparison of the camera view to template camera views.

In any event, the multi-accuracy state AR generation engine 134 may then determine the accuracy state for the client device 10 based on the determined confidence level for the pose. For example, if the multi-accuracy state AR generation engine 134 determines the pose of the user with a confidence level that exceeds a confidence threshold (e.g., the confidence level for the orientation is greater than 20 degrees, the confidence level for the location is greater than 20 meters, etc.), the multi-accuracy state AR generation engine 134 determines that the client device 10 is in the low accuracy state. In other implementations, the multi-accuracy state AR generation engine 134 determines that the client device 10 is in the low accuracy state when the confidence level for the pose of the user is within a first confidence threshold (e.g., the confidence level for the orientation is less than 50 degrees, the confidence level for the orientation is less than 50 meters, etc.) but exceeds a second threshold (e.g., 20 degrees, 20 meters, etc.).

The multi-accuracy state AR generation engine 134 then generates AR features to be presented within the camera view based on the accuracy state. As mentioned above, when the client device 10 is in the low accuracy state, the multi-accuracy state AR generation engine 134 may generate a first set of AR features, such as an indication of an approximate direction of a destination location, an indicator that the location accuracy is low, an indication of an approximate direction of a POI, an indication of an approximate direction of a location familiar to the user which may or may not be visible in the camera view, such as the user's home or a well-known landmark, etc. When the client device 10 is in the high accuracy state, the multi-accuracy state AR generation engine 134 may generate a second set of AR features with a higher level of precision than the AR features in the low accuracy state. The second set of AR features may include an indication of the destination location, such as a pin at the destination location, an indication of an estimated distance or duration to the destination location, an indicator that the location accuracy is high, indicators overlaying buildings that indicate the types of buildings, etc.

The multi-accuracy state AR generation engine 134 determines a position within the camera view to place each AR feature. The multi-accuracy state AR generation engine 134 may determine the position to place an AR feature by estimating the position of a location, POI, building, etc. corresponding to the AR feature within the camera view. The multi-accuracy state AR generation engine 134 may estimate the position of the location, POI, building, etc. corresponding to the AR feature within the camera view based on the determined pose of the user acting as the point-of-view of the camera and the position of the location, POI, building, etc. relative to the determined pose of the user. For example, if a destination location is about 50 meters north of the point-of-view of the camera, the multi-accuracy state AR generation engine 134 may overlay an AR feature corresponding to the destination location at a pixel position in the camera view which is about 50 meters north of the point-of-view of the camera. The multi-accuracy state AR generation engine 134 translates pixel positions to physical locations by obtaining parameters of the camera, such as the camera height, pitch, focal length, etc., and calculating the field of view of the camera based on these parameters.

In some implementations, such as when the client device is in the high accuracy state, the multi-accuracy state AR generation engine 134 determines the position to place an AR feature based on the template camera view stored in the real-world imagery database 136 matching the camera view from the client device 10. For example, the multi-accuracy state AR generation engine 134 may identify the position within the camera view for presenting an indication of the destination location based on the precise physical locations assigned to various positions within the matching template camera view.

Still further, when presenting AR features in the low accuracy state, the multi-accuracy state AR generation engine 134 may determine that an AR feature is at different positions within the camera view at different times even when the user has not moved due to the margin of error of the user's determined pose. To prevent AR features from jumping around in the camera view, the multi-accuracy state AR generation engine 134 may use a stable anchor for the user's pose. The stable anchor may be determined based on a combination of a geographic anchor and a visual inertial odometry (VIO) anchor. The geographic anchor is determined by using a visual positioning system to compare the camera view to template cameras stored in the real-world imagery database 136 in the manner described above. The geographic anchor is tied to a specific GPS location having a set of latitude, longitude, and/or altitude coordinates. However, when the client device is in the low accuracy state, the geographic anchor is unstable and may appear to jump around within the camera view. The VIO anchor is determined using sensor data from the client device 10 to estimate the user's pose and is not tied to a specific GPS location. Accordingly, the VIO anchor position is less likely to change and jump around over time as the sensor data only indicates a change in pose when the user is moving.

In some implementations, the stable anchor for the user's pose is a VIO anchor assigned the same initial pose as the geographic anchor, thus combining the two types of anchors. The multi-accuracy state AR generation engine 134 then references the VIO anchor for content anchoring since the VIO anchor pose is more stable in the low accuracy state.

In one implementation, when the distance between the VIO anchor and the geographic anchor exceeds a threshold, the multi-accuracy state AR generation engine 134 changes the pose of the VIO anchor to the pose of the geographic anchor and adjusts the positions of the AR features in the camera view based on the camera viewpoint changing to the pose of the geographic anchor.

In another implementation, when the margin of error for the geographic anchor decreases over time thereby improving localization accuracy, multi-accuracy state AR generation engine 134 changes the pose of the VIO anchor to the pose of the geographic anchor and adjusts the positions of the AR features in the camera view based on the camera viewpoint changing to the pose of the geographic anchor.

In any event, the multi-accuracy state AR generation engine 134 may overlay the AR features in the camera view and provide the camera view having the overlaid AR features to the client device 10 for display via the AR display module 48. In other implementations, the multi-accuracy state AR generation engine 134 may provide the AR features and positions within the camera view to overlay each AR features to the client device 10. The AR display module 48 may then present the AR features in the camera view at the respective positions.

The AR display module 48 and the multi-accuracy state AR generation engine 134 can operate as components of a geographic AR system. Alternatively, the geographic AR system can include only server-side components and simply provide the AR display module 48 with generated camera views. In other words, geographic AR techniques in these embodiments can be implemented transparently to the AR display module 48. As another alternative, the entire functionality of the AR display module 48 can be implemented in the multi-accuracy state AR generation engine 134. As yet another alternative, the entire functionality of the multi-accuracy state AR generation engine 134 can be implemented in the AR display module 48. More generally, the AR display module 48 and the multi-accuracy state AR generation engine 134 may execute on the client device 10, the server device 110, or any suitable combination of these.

For simplicity, FIG. 1 illustrates the augmented reality server 110 as only one instance of a server. However, the augmented reality server 110 according to some implementations includes a group of one or more server devices, each equipped with one or more processors and capable of operating independently of the other server devices. Server devices operating in such a group can process requests from the client device 10 individually (e.g., based on availability), in a distributed manner where one operation associated with processing a request is performed on one server device while another operation associated with processing the same request is performed on another server device, or according to any other suitable technique. For the purposes of this discussion, the term "server device" may refer to an individual server device or to a group of two or more server devices.

Example State Diagram

Figure 3:
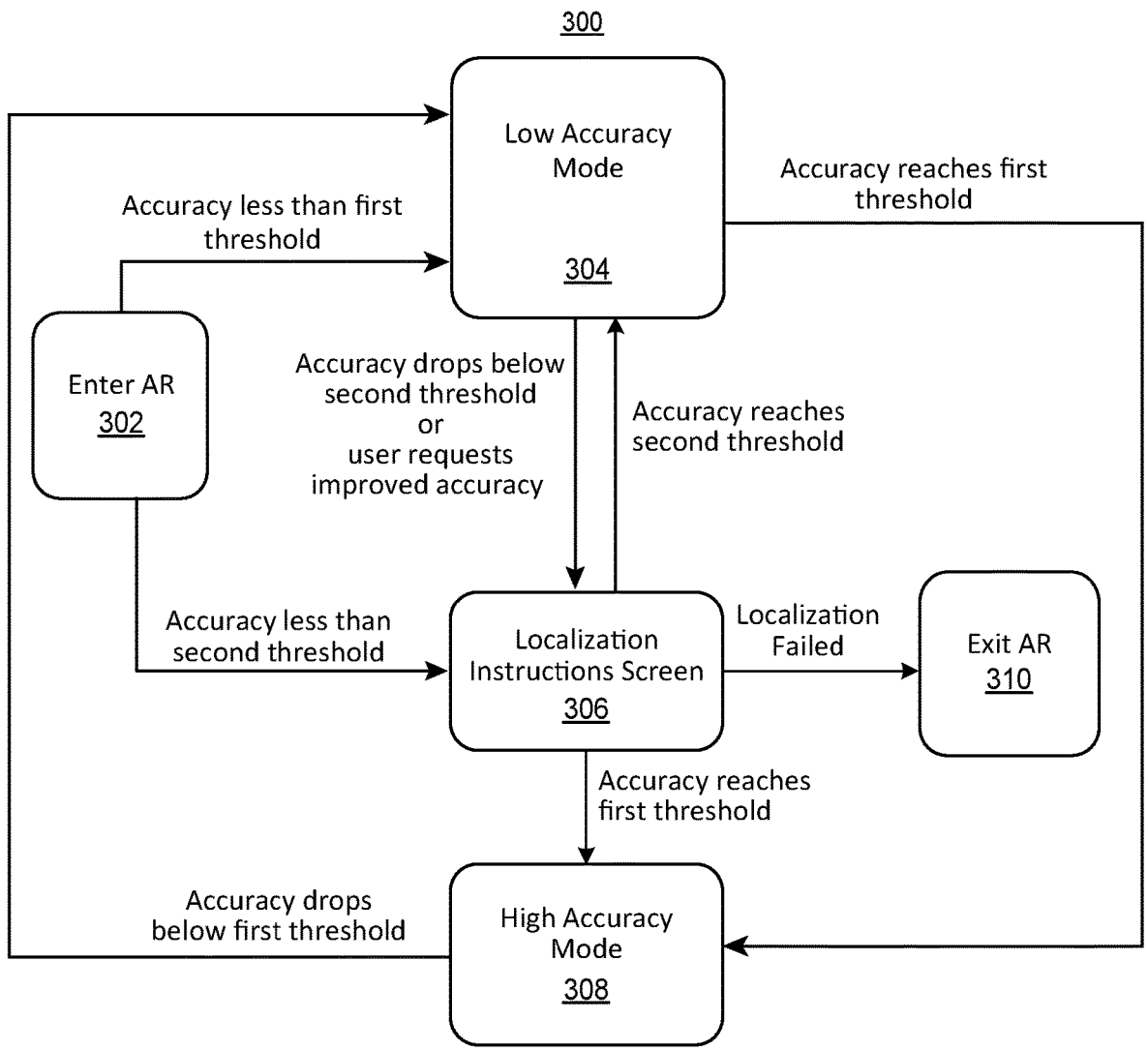
FIG. 3 is an example state diagram illustrating example states of a mapping application implementing an AR mode and the transitions between states.

FIG. 3 illustrates a state diagram 300 depicting example states of the mapping application 44 implementing the AR mode. At state 302, the user enters the AR mode. For example, the user may execute the mapping application 44 in the map display mode and may request navigation directions to a destination location. The mapping application 44 may then include a user control to view the navigation directions and/or the destination location in the AR mode. In response to receiving a selection of the user control, the mapping application 44 may switch from the map display mode to the AR mode presenting a camera view of the area in front of the client device 10.

Upon entering the AR mode, the mapping application 44 may determine the pose of the user to determine the viewpoint of the camera view for presenting AR features at corresponding positions within the camera view. Prior to localizing the user by requiring the user to point the camera at various buildings within the area, the mapping application 44 determines the pose of the user with a particular confidence level (e.g., ±50 degrees, ±50 meters, etc.) based on sensor data from sensors within the client device, such as the GPS, accelerometer, gyroscope, compass, magnetometer, transceiver, etc. In other implementations, the client device 10 transmits the sensor data to the augmented reality server 110 to determine the pose of the user with a particular confidence level.

In any event, if the accuracy of the determination is less than a first threshold accuracy level (e.g., the confidence level exceeds a first confidence threshold, such as 20 degrees, 20 meters, etc.), the client device 10 transitions to the low accuracy mode 304. In other implementations, the client device 10 transitions to the low accuracy mode if the accuracy of the determination is less than a first threshold accuracy level but greater than a second threshold accuracy level. For example, the confidence level may exceed the first confidence threshold, but is within a second confidence threshold, such as 50 degrees, 50 meters, etc. If the accuracy is less than the second threshold accuracy level, the client device 10 may exit the AR mode 310 or may present a localization instructions screen 306. The client device 10 may then transition to the low accuracy mode 304 upon presenting the localization instructions screen 306 if the accuracy improves and exceeds the second threshold accuracy level or may transition to the high accuracy mode 308 if the accuracy exceeds the first threshold accuracy level.

In any event, upon transitioning to the low accuracy mode 304, the mapping application 44 may present a first set of AR features overlaying the camera view for the low accuracy mode 304. The first set of AR features may include an indication of an approximate direction of a destination location, an indicator that the location accuracy is low with a user control, which when selected, provides instructions for improving the location accuracy, an indication of an approximate direction of a POI, an indication of an approximate direction of a location familiar to the user which may or may not be visible in the camera view, such as the user's home or a well-known landmark, etc. The first set of AR features are illustrated in more detail below with reference to FIG. 4.

In the low accuracy mode 304, if the user selects the user control for providing instructions for improving the location accuracy or the accuracy drops below the second threshold accuracy level, the mapping application 44 presents a localization instructions screen 306, which is described in more detail below with reference to FIG. 5. The localization instructions screen 306 may provide instructions for the user to point the camera at buildings in the area for the camera to capture images of the buildings. The client device 10 may then transmit the images to the augmented reality server 110 to compare to template camera views from the real-world imagery database 136, for example.

Each of the template camera views or images may be stored with an indication of the camera viewpoint or location from which the image was taken (e.g., a GPS location specifying latitude and longitude coordinates, a street address, etc.), an indication of the orientation of the camera when the image was taken (e.g., the camera was facing north, thereby indicating that the camera view depicts an area to the north of the viewpoint), indications of the scale or zoom level for the camera view, and/or an indication of a geographic area corresponding to the camera view including indications of precise physical locations at various positions within the camera view based on the scale or zoom level.

Based on the comparison to the template camera views, the client device 10 may obtain an indication of the pose of the user with a higher degree of accuracy than the pose determined based on the sensor data. In other implementations, the client device 10 may perform the template camera view comparison. Also in some implementations, the client device 10 and/or the augmented reality server 110 may determine the user's pose based on any suitable combination of the sensor data and the template camera view comparison.

In any event, if the accuracy of the determination reaches the first threshold (e.g., the confidence level is within the first confidence threshold, such as 20 degrees, 20 meters, etc.), the client device transitions to the high accuracy mode 308, thereby localizing the user. If the accuracy is less than the first threshold accuracy level, the client device 10 may exit the AR mode 310 or may transition back to the low accuracy mode 304. Also in some implementations, the client device 10 may transition directly from the low accuracy mode 304 to the high accuracy mode 308 without presenting the localization instructions screen 306 if the location accuracy reaches the first threshold accuracy level without needing to provide instructions to the user to increase the accuracy.

Upon transitioning to the high accuracy mode 308, the mapping application 44 may present additional or updated AR features in the camera view in accordance with the updated pose information, such as a second set of AR features overlaying the camera view for the high accuracy mode 308. The second set of AR features may provide location information with a higher degree of precision than the first set of AR features for the low accuracy mode 304. For example, the second set of AR features may include an indication of the destination location, such as a pin at the destination location, an indication of an estimated distance or duration to the destination location, an indicator that the location accuracy is high, indicators overlaying buildings that indicate the types of buildings, etc. The second set of AR features are illustrated in more detail below with reference to FIG. 6.

The mapping application 44 may continue to determine the user's pose over time. For example, the mapping application 44 may determine the user's pose continuously, periodically (e.g., once per second), when the user moves by more than a threshold amount, when the distance between the VIO anchor and the geographic anchor exceeds a threshold, when the margin of error for the geographic anchor decreases, etc. If the location accuracy drops below the first threshold (e.g., the confidence level exceeds a first confidence threshold, such as 20 degrees, 20 meters, etc.) or drops below a third threshold (e.g., the confidence level exceeds a third confidence threshold, such as 30 degrees, 30 meters, etc.), the client device 10 may transition back to the low accuracy mode 304.

This is merely one example state diagram for ease of illustration only. The client device 10 may transition states in any suitable manner and may include additional or alternative states.

Example User Interfaces

Figure 4:
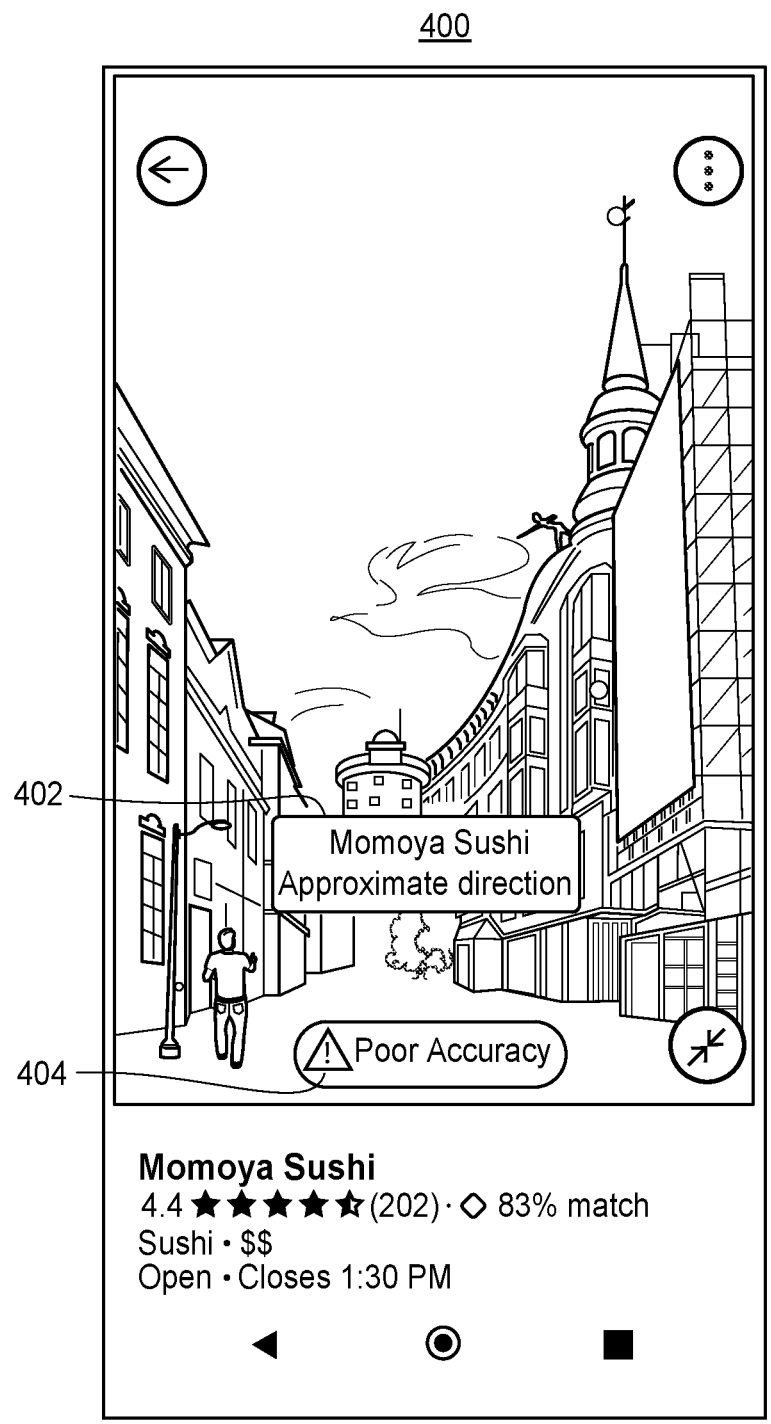
FIG. 4 is an example display of a camera view with AR features presented in the low accuracy state.
Figure 5:
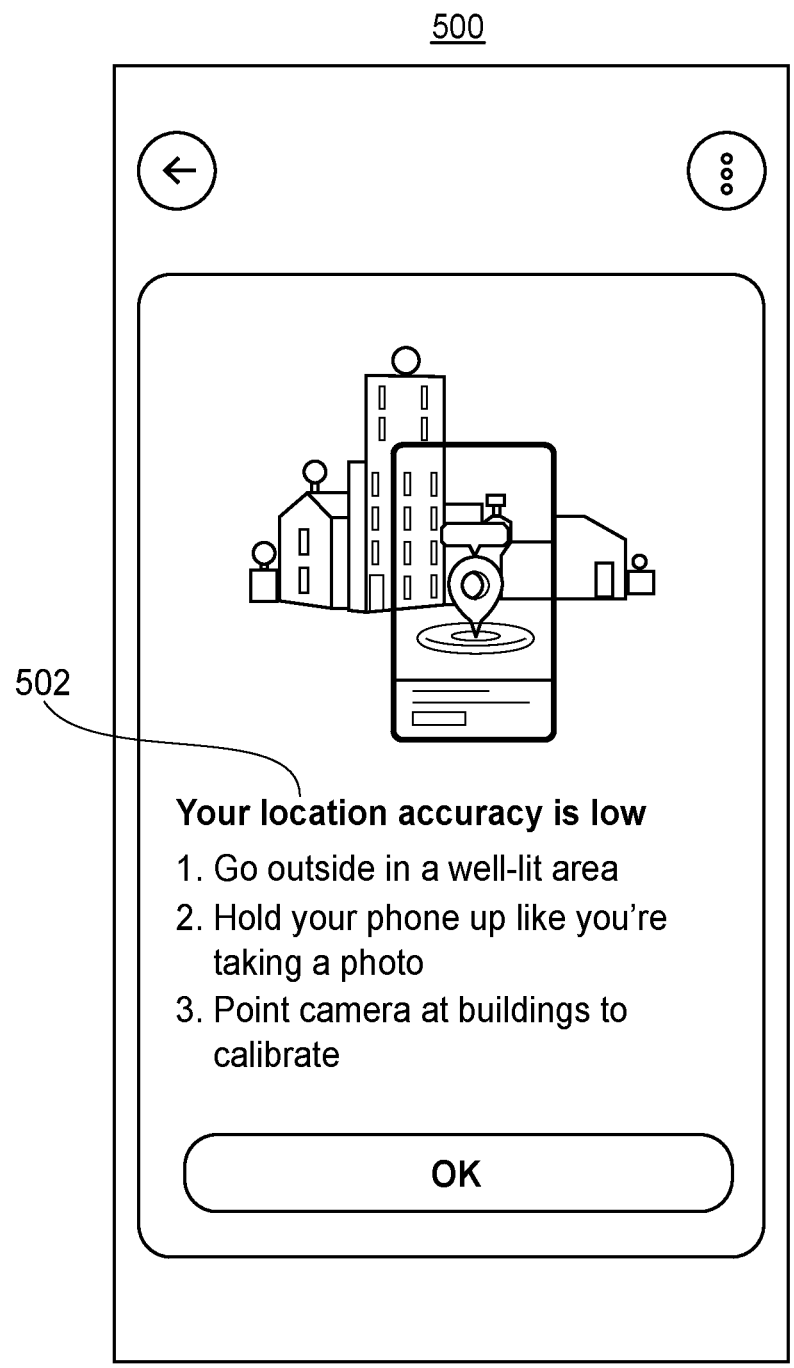
FIG. 5 is an example display of a localization instructions screen for transitioning to the high accuracy state.
Figure 6:
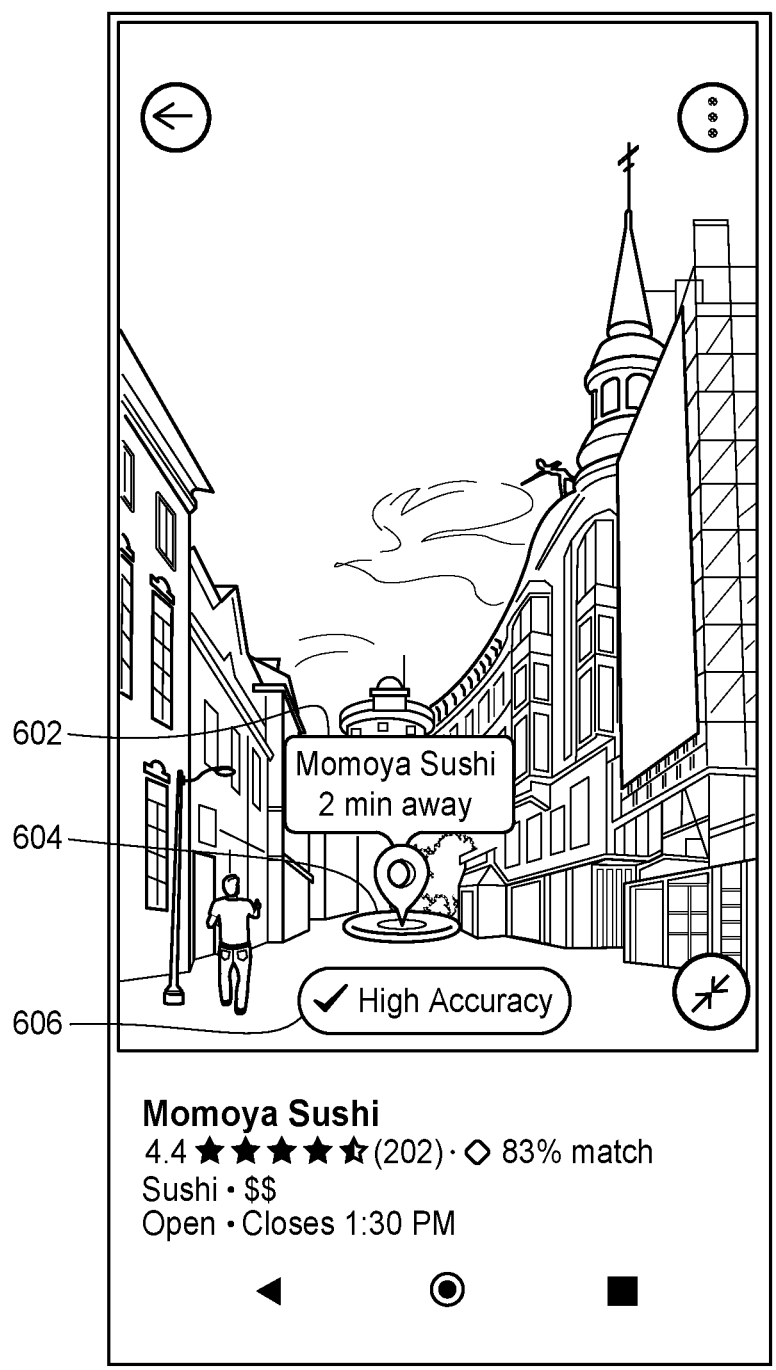
FIG. 6 is an example display of a camera view with AR features presented in the high accuracy state.

FIGS. 4-6 illustrate example user interfaces which may be presented on the client device 10 via the mapping application 44 in the AR mode. These are merely a few example user interfaces included for ease of illustration only. Additional or alternative user interfaces may be included as well as additional or alternative AR features presented in the user interfaces.

In any event, FIG. 4 illustrates an example display 400 of the user's camera view of real-world imagery in an AR mode of a mapping application 44 in a low accuracy state. The example display 400 may be presented on the client device 10. The camera view includes buildings in the area surrounding the user. The example display 400 also includes AR features 402, 404 overlaid on the real-world imagery when the client device 10 is in the low accuracy state. The AR features 402, 404 include an indicator 402 of the approximate direction of Momoya Sushi, which may be a destination location that the user requested navigation directions to in the map display mode or a POI that the user selected in the map display mode. The indicator is overlaid on the real-world imagery at a position in the camera view corresponding to the approximate direction of Momoya Sushi. Additionally, the display 400 includes an indicator or chip 404 that informs the user that the client device 10 is in the low accuracy state. The chip 404 may include a user control, which when selected (e.g., via a tap gesture), provides instructions for improving the location accuracy. For example, in response to receiving a selection of the user control 404, the mapping application presents a localization instructions screen, such as the localization instructions screen 500 as shown in FIG. 5.

Referring now to FIG. 5, the localization instructions screen 500 includes instructions 502 for improving the location accuracy to transition from the low accuracy state to the high accuracy state. More specifically, the instructions 502 may tell the user to point the camera at buildings in the area for the camera to capture images of the buildings. The client device 10 may then transmit the images to the augmented reality server 110 to compare to template camera views from the real-world imagery database 136, for example. If there is a match with a template camera view, the augmented reality server 110 and/or the client device 10 may determine the user's pose with a location accuracy that reaches an accuracy threshold for transitioning to the high accuracy state (e.g., the confidence level for the pose determination is within a confidence threshold, such as 20 degrees, 20 meters, etc.).

In response to transitioning to the high accuracy state, the mapping application 44 may present a second set of AR features overlaying the camera view which are different from the AR features in the display 400 as shown in FIG. 4. FIG. 6 illustrates an example display 600 of the user's camera view of real-world imagery in the AR mode of the mapping application 44 in the high accuracy state. The example display 600 may be presented on the client device 10. The camera view includes the same buildings in the same area surrounding the user as in the display 400 of FIG. 4. However, the example display 600 also includes different AR features 602-606 from the AR features 402, 404 of FIG. 4. The AR features 602-606 are overlaid on the real-world imagery when the client device 10 is in the high accuracy state. The AR features 602-606 include a graphical indication 604 of the location of Momoya Sushi, where the indication 604 is a pin. The pin 604 is overlaid on the real-world imagery at a position in the camera view corresponding to the location of Momoya Sushi. Above the pin 604, the display 600 includes a text indicator 602 that includes the name of the location (Momoya Sushi) and an estimated duration from the user's current location to the Momoya Sushi (2 minutes). The text indicator 602 may also include additional information about the location, such as the distance from the user's current location to Momoya Sushi, a description of Momoya Sushi, a closing time for Momoya Sushi, etc. Additionally, the display 600 includes yet another indicator or chip 606 that informs the user that the client device 10 is in the high accuracy state. Still further, the display 600 may include other graphical indicators (not shown) overlaying buildings or other POIs within the camera view. The graphical indicators may indicate the type of building or other POI (e.g., a restaurant, a bar, a department store, etc.), the name of the building or other POI, or may include any other suitable information about the building or other POI. In some implementations, each graphical indicator may include a user control, which when selected, may provide additional information regarding the building or other POI.

Example Method for Presenting AR Features without Localizing a User

Figure 7:
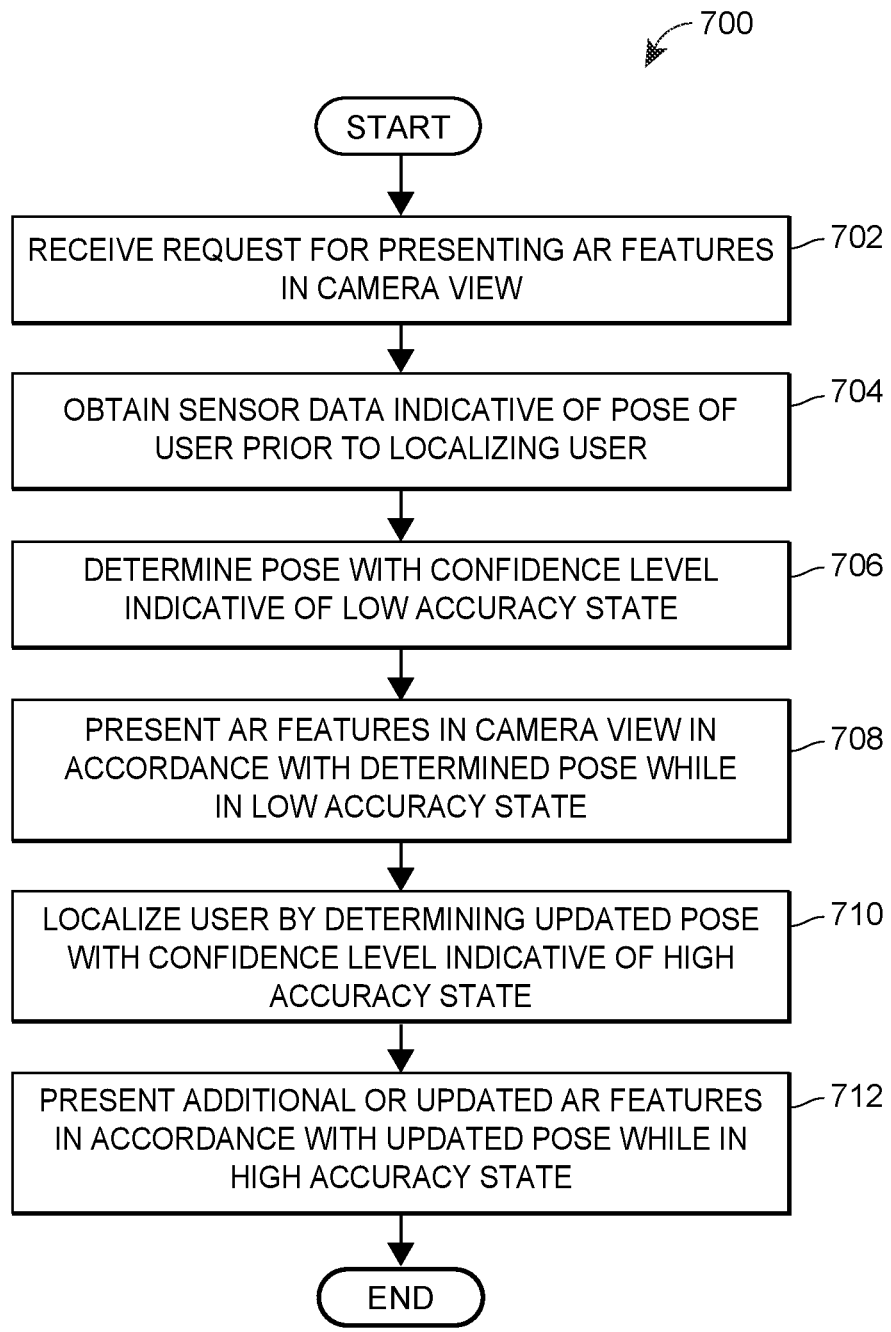
FIG. 7 is a flow diagram of an example method for presenting augmented reality features without localizing a user, which can be implemented in a client device.

FIG. 7 illustrates a flow diagram of an example method 700 for presenting AR features without localizing a user. The method can be implemented in a set of instructions stored on a computer-readable memory and executable at one or more processors of the client device 10. For example, the method can be implemented by the AR display module 48.

At block 702, a request is received for presenting AR features in the camera view of the client device 10. For example, in a map display mode of the mapping application 44, the user may request navigation directions to a destination location. The mapping application 44 may then include a user control to view the navigation directions and/or the destination location in the AR mode. In response to receiving a selection of the user control, the mapping application 44 may switch from the map display mode to the AR mode presenting a camera view of the area in front of the client device 10.

Then at block 704, sensor data is obtained which is indicative of the pose of the user. The sensor data is obtained prior to capturing images of buildings in the area and comparing the captured images to template camera views from the real-world imagery database 136 to localize the user. The sensor data may include GPS data, accelerometer data, gyroscope data, compass data, magnetometer data, IMU data, transceiver data that indicates the signal strengths of signals received from nearby wireless devices, such as wireless beacons, or any other suitable sensor data.

At block 706, the client device 10 determines the pose of the user with a particular confidence level based on the sensor data. In some implementations, the client device may transmit the sensor data to the augmented reality server 110 which determines the pose of the user with a particular confidence level, and transmits the determined pose of the user to the client device 10. The client device 10 and/or the augmented reality server 110 may analyze the sensor data using a particle filter in the manner described above to determine the pose of the user with a particular confidence level. In other implementations, the client device 10 and/or the augmented reality server 110 may combine the sensor data in any suitable manner to determine the pose of the user.

In any event, the client device 10 determines that it is in the low accuracy state based on the confidence level of the pose. For example, the client device 10 may compare the confidence level for the pose to a threshold confidence level. When the confidence level exceeds the threshold confidence level, the client device 10 may determine that it is in the low accuracy state. In another example, the client device 10 may compare the confidence level for the pose to a first threshold confidence level and a second threshold confidence level having a larger margin of error than the first threshold confidence level. When the confidence level for the pose exceeds the first confidence level but is within the second confidence level, the client device 10 may determine that it is in the low accuracy state.

At block 708, the client device 10 presents a first set of AR features overlaying real-world imagery in the camera view for the low accuracy state. The AR features are presented at positions within the camera view corresponding to the locations, buildings, POIs, etc., which the AR features refer to. In some implementations, the augmented reality server 110 generates the AR features and determines the position within the camera view to place each AR feature.

The augmented reality server 110 may determine the position to place an AR feature by estimating the position of a location, POI, building, etc. corresponding to the AR feature within the camera view. The augmented reality server 110 may estimate the position of the location, POI, building, etc. corresponding to the AR feature within the camera view based on the determined pose of the user acting as the point-of-view of the camera and the position of the location, POI, building, etc. relative to the determined pose of the user. For example, if a destination location is about 50 meters north of the point-of-view of the camera, the augmented reality server 110 may overlay an AR feature corresponding to the destination location at a pixel position in the camera view which is about 50 meters north of the point-of-view of the camera. The augmented reality server 110 translates pixel positions to physical locations by obtaining parameters of the camera, such as the camera height, pitch, focal length, etc., and calculating the field of view of the camera based on these parameters. The augmented reality server 110 may then transmit the AR features and indications of the positions to place each AR feature within the camera view to the client device 10. In other implementations, the client device 110 generates the AR features and determines the position within the camera view to place each AR feature.

The first set of AR features may include an indication of an approximate direction of a destination location, an indicator that the location accuracy is low with a user control, which when selected, provides instructions for improving the location accuracy, an indication of an approximate direction of a POI, an indication of an approximate direction of a location familiar to the user which may or may not be visible in the camera view, such as the user's home or a well-known landmark, etc.

Then at block 710, the client device 10 localizes the user. For example, the user may point the camera at buildings or geographic features in the area for the camera to capture images of the buildings or geographic features. The client device 10 may then transmit the images to the augmented reality server 110 that compares the images to template camera views stored in the real-world imagery database 136, for example. Each of the template camera views or images may be stored with an indication of the camera viewpoint or location from which the image was taken, an indication of the orientation of the camera when the image was taken, indications of the scale or zoom level for the camera view, and/or an indication of a geographic area corresponding to the camera view including indications of precise physical locations at various positions within the camera view based on the scale or zoom level.

If there is a match with a template camera view, the augmented reality server 110 and/or the client device 10 may determine an updated pose for the user with a location accuracy that reaches an accuracy threshold for transitioning to the high accuracy state (e.g., the confidence level for the pose determination is within a confidence threshold, such as 20 degrees, 20 meters, etc.). In other implementations, the augmented reality server 110 combines the pose determination from the camera view comparison with the pose determination from the sensor data to determine the updated pose of the user with a location accuracy that reaches an accuracy threshold.

In yet other implementations, the client device 10 localizes the user by continuously or periodically obtaining and analyzing updated sensor data to determine an updated pose for the user with a confidence level that is within a confidence threshold for the high accuracy state without a camera view comparison.

Then at block 712, the client device 10 presents a second set of AR features overlaying real-world imagery in the camera view for the high accuracy state, which are different and more precise than the first set of AR features. The AR features are presented at positions within the camera view corresponding to the locations, buildings, POIs, etc., which the AR features refer to. In some implementations, the augmented reality server 110 generates the AR features and determines the position within the camera view to place each AR feature.

The augmented reality server 110 may determine the position to place an AR feature by estimating the position of a location, POI, building, etc. corresponding to the AR feature within the camera view. The augmented reality server 110 may determine the position to place an AR feature based on the template camera view stored in the real-world imagery database 136 matching the camera view from the client device 10. For example, the augmented reality server 110 may identify the position within the camera view for presenting an indication of the destination location based on the precise physical locations assigned to various positions within the matching template camera view.

The augmented reality server 110 may then transmit the second set of AR features and indications of the positions to place each AR feature within the camera view to the client device 10. In other implementations, the client device 110 generates the second set of AR features and determines the position within the camera view to place each AR feature.

The second set of AR features may include an indication of the destination location, such as a pin at the destination location, an indication of an estimated distance or duration to the destination location, an indicator that the location accuracy is high, indicators overlaying buildings that indicate the types of buildings, etc.

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. As used herein "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The method 700 may include one or more function blocks, modules, individual functions or routines in the form of tangible computer-executable instructions that are stored in a non-transitory computer-readable storage medium and executed using a processor of a computing device (e.g., a server device, a personal computer, a smart phone, a tablet computer, a smart watch, a mobile computing device, or other client computing device, as described herein). The method 700 may be included as part of any backend server (e.g., an augmented reality server, a map data server, a navigation server, or any other type of server computing device, as described herein), client computing device modules of the example environment, for example, or as part of a module that is external to such an environment. Though the figures may be described with reference to the other figures for ease of explanation, the method 700 can be utilized with other objects and user interfaces. Furthermore, although the explanation above describes steps of the method 700 being performed by specific devices (such as an augmented reality server 110 or a client device 10), this is done for illustration purposes only. The blocks of the method 700 may be performed by one or more devices or other parts of the environment.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as an SaaS. For example, as indicated above, at least some of the operations may be performed by a group of computers (as examples of machines including processors), these operations being accessible via a network (e.g., the Internet) and via one or more appropriate interfaces (e.g., APIs).

Still further, the figures depict some embodiments of the example environment for purposes of illustration only. One skilled in the art will readily recognize from the following discussion that alternative embodiments of the structures and methods illustrated herein may be employed without departing from the principles described herein.

Upon reading this disclosure, those of skill in the art will appreciate still additional alternative structural and functional designs for presenting AR features in a low accuracy state through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for presenting augmented reality features without localizing a user, the method comprising:
   receiving, by one or more processors, a request for presenting augmented reality features in a camera view of a computing device of the user;
   prior to localizing the user, obtaining, by the one or more processors, sensor data indicative of a location of the user;
   determining, by the one or more processors, the location of the user based on the sensor data with a confidence level that exceeds a confidence threshold which indicates a low accuracy state having a low degree of precision for the location of the user;
   presenting, by the one or more processors, one or more augmented reality features in the camera view in accordance with the determined location of the user while in the low accuracy state, wherein the one or more augmented reality features have a lower degree of precision than additional or updated augmented reality features presented while in a high accuracy state having a high degree of precision for the location of the user;
   after presenting the one or more augmented reality features while in the low accuracy state, localizing the user by determining an updated location of the user with a confidence level within the confidence threshold which indicates the high accuracy state; and
   presenting, by the one or more processors, the additional or updated augmented reality features in the camera view in accordance with the updated location of the user while in the high accuracy state.

2. The method of claim 1, wherein determining the updated location of the user with the confidence level within the confidence threshold includes:
   providing, by the one or more processors, an image of the camera view and an indication of the determined location to a server device, wherein the server device compares the image of the camera view to street-level imagery at the determined location to localize the user; and
   receiving, by the one or more processors, the updated location of the user from the server device based on the comparison.

3. The method of claim 1, wherein determining the location of the user includes:
   generating, by the one or more processors, a geographic anchor;
   generating, by the one or more processors, a visual inertial odometry (VIO) anchor at an initial location of the geographic anchor; and
   determining, by the one or more processors, the location of the user based on the VIO anchor.

4. The method of claim 1, further comprising:
   receiving, by the one or more processors, a request for navigation directions to a destination location,
   wherein the one or more augmented reality features include an indicator of a direction to travel in to reach the destination location.

5. The method of claim 1, wherein the location of the user is determined based on the sensor data using a particle filter.

6. The method of claim 1, wherein obtaining the sensor data includes obtaining the sensor data from at least one of: an accelerometer, a positioning sensor, a transceiver, a gyroscope, a compass, or a magnetometer.

7. The method of claim 1, wherein the one or more augmented reality features includes an indication of an orientation of a landmark that is not visible within the camera view.

8. A computing device for presenting augmented reality features without localizing a user, the computing device comprising:
a camera;
one or more processors; and
a computer-readable memory coupled to the camera and the one or more processors and storing instructions thereon that, when executed by the one or more processors, cause the computing device to:
receive a request for presenting augmented reality features in a camera view of the camera;
prior to localizing the user, obtain sensor data indicative of a location of the user;
determine the location of the user based on the sensor data with a confidence level that exceeds a confidence threshold which indicates a low accuracy state having a low degree of precision for the location of the user;
present one or more augmented reality features in the camera view in accordance with the determined location of the user while in the low accuracy state, wherein the one or more augmented reality features have a lower degree of precision than augmented reality features presented while in a high accuracy state having a high degree of precision for the location of the user;
after presenting the one or more augmented reality features while in the low accuracy state, localize the user by determining an updated location of the user with a confidence level within the confidence threshold which indicates the high accuracy state; and
present the additional or updated augmented reality features in the camera view in accordance with the updated location of the user while in the high accuracy state.

9. The computing device of claim 8, wherein to determine the updated location of the user with the confidence level within the confidence threshold, the instructions cause the computing device to:
provide an image of the camera view and an indication of the determined location to a server device, wherein the server device compares the image of the camera view to street-level imagery at the determined location to localize the user; and
receive the updated location of the user from the server device based on the comparison.

10. The computing device of claim 8, wherein to determine the location of the user, the instructions further cause the computing device to:
generate a geographic anchor;
generate a visual inertial odometry (VIO) anchor at an initial location of the geographic anchor; and
determine the location of the user based on the VIO anchor.

11. The computing device of claim 8, wherein the instructions further cause the computing device to:
receive a request for navigation directions to a destination location,
wherein the one or more augmented reality features include an indicator of a direction to travel in to reach the destination location.

12. The computing device of claim 8, wherein the location of the user is determined based on the sensor data using a particle filter.

13. The computing device of claim 8, wherein the sensor data is obtained from at least one of: an accelerometer, a positioning sensor, a transceiver, a gyroscope, a compass, or a magnetometer.

14. The computing device of claim 8, wherein the one or more augmented reality features includes an indication of an orientation of a landmark that is not visible within the camera view.

15. A non-transitory computer-readable medium storing instructions thereon that, when executed by one or more processors, cause the one or more processors to:
receive a request for presenting augmented reality features in a camera view of a computing device of a user;
prior to localizing the user, obtain sensor data indicative of a location of the user;
determine the location of the user based on the sensor data with a confidence level that exceeds a confidence threshold which indicates a low accuracy state having a low degree of precision for the location of the user;
present one or more augmented reality features in the camera view in accordance with the determined location of the user while in the low accuracy state, wherein the one or more augmented reality features have a lower degree of precision than augmented reality features presented while in a high accuracy state having a high degree of precision for the location of the user;
after presenting the one or more augmented reality features while in the low accuracy state, localize the user by determining an updated location of the user with a confidence level within the confidence threshold which indicates the high accuracy state; and
present the additional or updated augmented reality features in the camera view in accordance with the updated location of the user while in the high accuracy state.

16. The non-transitory computer-readable medium of claim 15, wherein to determine the updated location of the user with the confidence level within the confidence threshold, the instructions cause the one or more processors to:
provide an image of the camera view and an indication of the determined location to a server device, wherein the server device compares the image of the camera view to street-level imagery at the determined location to localize the user; and
receive the updated location of the user from the server device based on the comparison.

17. The non-transitory computer-readable medium of claim 15, wherein the instructions further cause the one or more processors to:
generate a geographic anchor;
generate a visual inertial odometry (VIO) anchor at an initial location of the geographic anchor; and
determine the location of the user based on the VIO anchor.

* * * * *